N. DAVIS.
Coffee Roaster.
No. 110,017.                                              Patented Dec. 13, 1870.
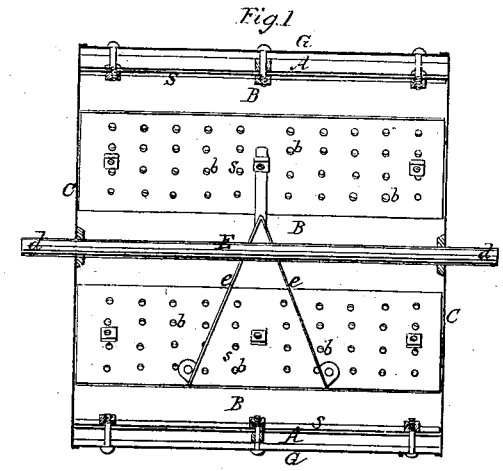
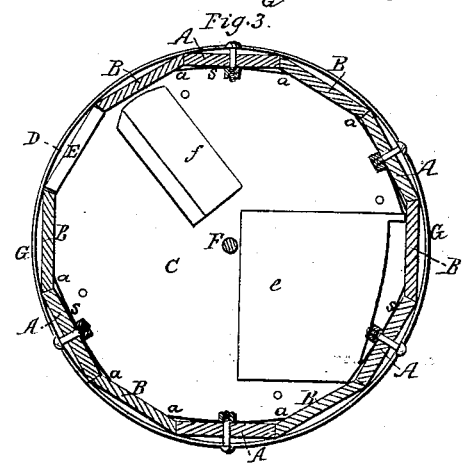
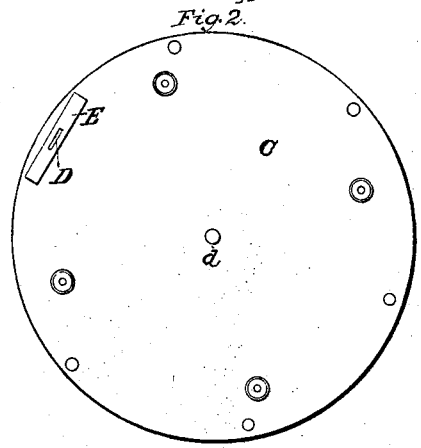
Witnesses
S. N. Piper
L. N. Möller.
Noah Davis,
by his attorney
R. H. Eddy

United States Patent Office.

NOAH DAVIS, OF BOSTON, MASSACHUSETTS.

Letters Patent No. 110,017, dated December 13, 1870.

IMPROVEMENT IN COFFEE-ROASTERS.

The Schedule referred to in these Letters Patent and making part of the same.

*To all persons to whom these presents may come:*

Be it known that I, NOAH DAVIS, of Boston, of the county of Suffolk and State of Massachusetts, have invented a new and useful Improvement in Coffee-Roasters; and do hereby declare the same to be fully described in the following specification and represented in the accompanying drawing, of which—

Figure 1 is a longitudinal section;
Figure 2, an end view; and
Figure 3, a transverse section of a coffee-roaster or roasting-drum, as made in accordance with my invention.

The periphery of the said drum is composed of a cylindrical casing, G, or series of elongated metallic boxes or chambers A, and a series of plates or thin bars, B, of steatite, arranged in manner as represented, and with their ends against two circular metallic heads C C.

Each of the plates or bars of steatite is held in place between the two next adjacent boxes A by flanges $a$ $a$, arranged on the latter, as shown, and there is an opening, D, on the side of the drum, to be provided with a closing slide or door, E.

Each chamber A has its inner plate made foraminous, or punctured with a series of small holes, $b$.

The said chamber also has a hole, $c$, made in one or in each end of it, at or near one corner of the chamber.

The metal of which the article is to be made should be iron, and it should be plated on its interior surface with silver, as shown at $s$, in order to protect it from oxidation by the acid developed during the roasting of coffee.

The drum so made is provided with a shaft, F, whose journals are exhibited at $d$ $d$.

Within the interior of the drum are deflecting-plates $e$ $e$ and $ff$, arranged as represented; the two $e$ $e$ being disposed at an acute angle with each other, and placed at the middle of the drum and against its inner periphery.

The other two plates or wings, $ff$, extend inward from the ends of the drum and near its inner periphery.

While the drum may be in revolution, the deflecting-plates $e$ $e$ will spread the coffee laterally toward the ends of the drum, after which it will be moved inward toward the middle of the drum by the wings $ff$. Thus, while the drum may be in operation the coffee will be moved laterally back and forth, and raised and turned over, so as to bring every kernel of it into contact with the roasting surfaces.

The hollow boxes A become so many receivers of the vapors discharged from the coffee while it may be in the act of being roasted, such vapors escaping by the holes at the ends of such receivers.

Most, if not all, the oil of the coffee will remain in the drum.

By thus discharging the vapors and employing the steatite plates, the coffee may be roasted evenly and with great despatch, and to much advantage.

The steatite plates, by being held in place by the flanges, and with sufficient room for expansion, can expand without danger of breakage.

I claim as my invention in the above-described coffee-roaster as follows:

1. The arrangement and combination of the series of foraminous vapor-receiving and eduction-chambers A with the outer casing G and heads C C of the drum.

2. The combination and arrangement of the series of steatite plates or bars B with the series of foraminous vapor-receiving and eduction-chambers A, the outer casing G, and heads C C of the drums, all being substantially as described.

3. The combination and arrangement of the flanges $a$ with the series of vapor-receiving and eduction-chambers A, the outer casing G, and heads C C of the drum, as set forth.

4. The arrangement and combination of the deflecting-plates $e$ and the rings $ff$ with the coffee-roasting drum.

5. A coffee-roasting drum, as made of iron, coated with a plating of silver arranged on its inner surface, or such part or parts thereof as, while the drum may be in use, may be exposed to the acid evolved from the coffee.

NOAH DAVIS.

Witnesses:
R. H. EDDY,
J. R. SNOW.